United States Patent [19]

Kishida

[11] Patent Number: 4,859,027

[45] Date of Patent: Aug. 22, 1989

[54] LENTICULAR LENS SCREEN

[75] Inventor: Hideo Kishida, Tokyo, Japan

[73] Assignee: Dai Nippon Insatsu Kabushiki Kaisha, Tokyo, Japan

[21] Appl. No.: 159,733

[22] Filed: Feb. 24, 1988

[30] Foreign Application Priority Data

Feb. 28, 1987 [JP] Japan .................. 62-46533

[51] Int. Cl.⁴ .............................................. G03B 21/60
[52] U.S. Cl. ................................................. 350/128
[58] Field of Search ........................... 350/127–129

[56] References Cited

U.S. PATENT DOCUMENTS 4,536,056 8/1985 Oguino ................................ 350/128
4,636,035 1/1987 Clausen et al. .................... 350/128
4,752,116 6/1988 Sekiguchi .......................... 350/128

Primary Examiner—Richard A. Wintercorn
Attorney, Agent, or Firm—Arnold, White & Durkee

[57] ABSTRACT

A lenticular lens screen is provided with first and second lenticular lens arrangements on light incident and outgoing sides which include unit lenses (i.e. lenticles) respectively. Each lenticle on the light outgoing side has a section of substantially semicircular or near arcuate shape having a radius smaller than a radius of a section of substantially semicircular or near arcuate shape of the lenticle on the light incident side. The lenticle on the light outgoing side is provided with an apex positioned inside the intersecting point of lights projected through both end portions of the lenticle on the light incident side.

17 Claims, 5 Drawing Sheets

LENTICULAR LENS SCREEN

BACKGROUND OF THE INVENTION

This invention relates to a lenticular lens screen constituting a transmission type screen used for a rear projection apparatus.

For the rear projection apparatus, the wide horizontal audience coverage and the even brightness of the image are required. To realize this requirement, it is necessary for the transmission type screen to horizontally and sufficiently diffuse the light projected to the screen.

A lenticular lens screen is used for this purpose as one optical element to diffuse the projected lights. In a prior art, a lenticular lens arrangement is located only on the light incident side of the screen, and the diffusion of the outgoing light has been controlled by the arrangement of the lenticular lens assembly, each unit lens, i.e. lenticle, having a section approximately semicircular or elliptical.

Recently, a screen provided with the lenticular lens arrangement on the light outgoing side has been proposed such as disclosed in the Japanese Patent Laid-open (KOKAI) No. 58-134627, in which the lenticular lens arrangement on the light outgoing side of the screen is located on a light focused surface of the lenticular lens arrangement on the light incident side. The purpose of the lenticular lens arrangement on the light outgoing side is not to diffuse the light but to compensate for an inclination of the light projected obliquely with respect to the optical axis of the lenticular lens by the coma aberration generated by the lenticular lens arrangement on the light incident side of the screen.

As described above, in the conventional technique of the lenticular lens screen, the light diffusion depends only on the lenticular lens arrangement located on the light incident side, and for this reason, in order to increase the degree of the outgoing light diffusion, it is necessary to elongate, in the optical axis direction, the sectional shape of a unit lens (called hereinafter a lenticle) constituting the lenticular lens arrangement on the light incident side.

The elongation of the sectional shape of the lenticule will cause the following significant problems.

(a) It is difficult to produce a mold to be used for manufacturing a screen and the durability of the thus produced mold is not good.

(b) In case the screen is formed by an extrusion molding method with high productivity, the shape of the designed lens is not desirably realized.

SUMMARY OF THE INVENTION

It is accordingly an object of this invention to eliminate disadvantages or drawbacks encountered with the prior art and to provide an improved lenticular lens screen with wide diffusing angles and which is manufactured easily and precisely.

Another object of this invention is to provide a lenticular lens screen provided with a lenticular lens arrangement on the light outgoing side of a lens screen as well as on the incident side.

These and other objects can be achieved, according to this invention, by a lenticular lens screen which comprises a sheet-like screen body, one lenticular lens arrangement comprising a plurality of unit lenses, (i.e. lenticles,) formed on one side of the screen body through which light is incident to the screen, and the other lenticular lens arrangement comprising a plurality of unit lenses, (i.e. lenticles,) formed on the other side of the screen body through which light exits the screen, each of the lenticles of the light incident side having a section of an entire or an arcuate part of a semicircular or an approximately semicircular shape, and each of the lenticles of the light outgoing side having a section of an entire or an arcuate part of semicircular or an approximately semicircular shape, and a radius of a substantially semicircular section of the lenticle on the light outgoing side is smaller than the radius of a substantially semicircular section of the lenticle on the light incident side, and each of the apexes of lenticles on the light outgoing side of the screen body being positioned inwardly to the light incident side as viewed from an intersecting point of lights projected parallelly to an optical axis of the lenticle on the light incident side through both end portions thereof.

According to the preferred embodiment of the invention, the lights projected through the lenticle on the light incident side of the lenticular lens screen exit through the lenticle on the light outgoing side thereof with large light diffusing angles, the latter lenticle having a radius smaller than that of the former lenticle and also having an apex inside the intersecting point of lights projected through both end portions of the lenticle on the light incident side, thus being capable of improving the productivity of the lenticular lens screen and realizing the improved image when the screen is applied to a video-projector, for example.

This invention will be further described in detail below with reference to the accompanying drawings.

DESCRIPTION OF THE PREFERRED EMBODIMENTS

Figure 1:
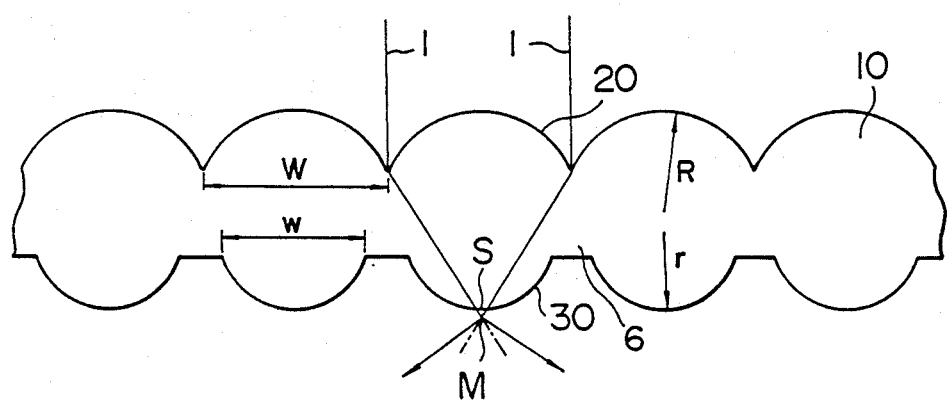
FIG. 1 is a brief illustration of a horizontal cross sectional view of a lenticular lens screen of one embodiment according to the invention.

FIG. 1 is a horizontal cross sectional view showing a basic structure of one embodiment of a lenticular lens screen according to the invention.

Referring to FIG. 1, the lenticular lens screen 10 comprises a sheet-like screen body which is provided with a light incident side on which are formed a light incident side lenticular lens arrangement comprising a plurality of continuous lenticles 20 each having a section of an entire or an arcuate part of a semicircular or an approximately semicircular shape, and also provided with a light outgoing side on which are formed a light outgoing side lenticular lens arrangement comprising a plurality of spaced lenticles 30 each having a section of an entire or an arcuate part of a semicircular or an approximately semicircular shape, the radius of the substantially semicircular shape of the lenticle on the light outgoing side is made smaller than that of the light incident side. Flat land portions 6 are formed between adjacent lenticles 30 as no-light-outgoing portions which transmit no light. The lenticle 30 on the light outgoing side has an apex S positioned inside the intersecting portion M of the lights 1 and 1' projected parallelly to the optical axis through both ends of the lenticle 20.

According to this design of the lenticular lens arrangements on the light incident and outgoing sides of the screen 10, a horizontal diffusion angle of each light beam, which is horizontal angle between which the brightness of the light falls to half of the peak brightness, can be widened. This is because an angle of the outgoing light with respect to a plane perpendicular to the screen becomes large for the reason that a line parallel to the optical axis of the lenticle and a line normal to the lens surface constitute a certain angle at a portion of the lenticle 30 from which the light exits.

Figure 2:
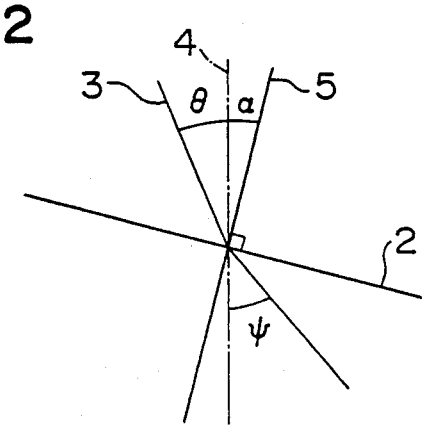
FIG. 2 is a view explanatory of the light refraction on the light outgoing side of the lenticular lens screen shown in FIG. 1.

FIG. 2 is an explanatory view of the light refraction on the lenticular lens screen 10 of this invention, in which, at a portion at which a line 5 normal to the lens surface 2 of the light outgoing side has an inclination $\alpha$ with respect to a line 4 parallel to the optical axis of the lenticle, the outgoing light 3 with an angle $\theta$ with respect to a line 4 parallel to the optical axis of the lenticle is refracted at the lens surface 2 and actually outgoes therefrom with an angle $\Psi$.

The angle $\Psi$ will be obtained by the following equation.

$$\Psi = \sin^{-1}[n \cdot \sin(\theta + \alpha)] - \alpha$$

(n: index of refraction of a material constituting the screen).

Figure 3:
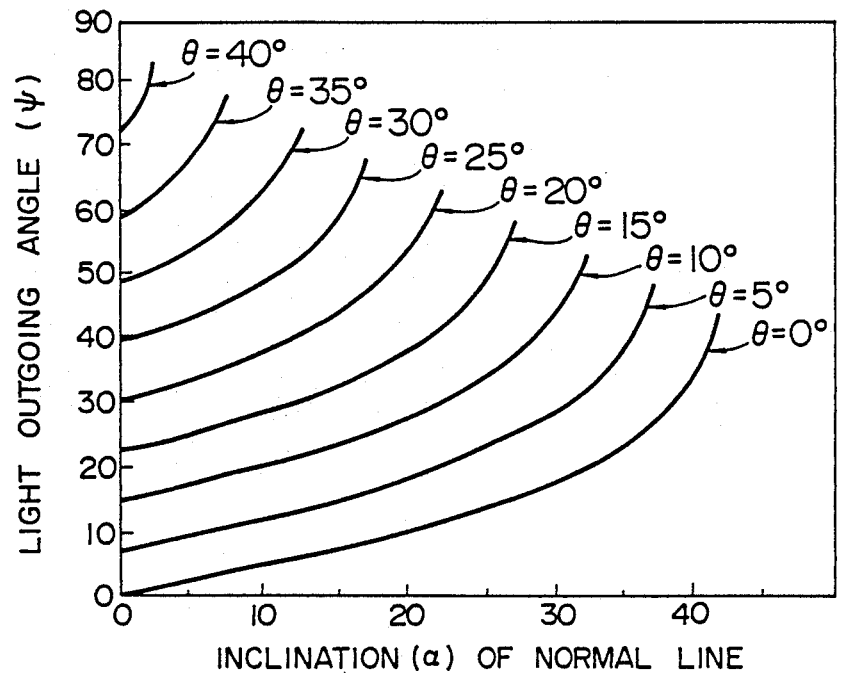
FIG. 3 is a graph representing a relationship between a light outgoing angle $\Psi$ and an angle $\alpha$ constituted by a line parallel to an optical axis of the lenticle and a line normal to the light outgoing surface of the lenticle.

FIG. 3 is a graph representing the relationship between the angles $\alpha$ and $\Psi$.

Concerning the graph of FIG. 3, when a screen is provided with a flat light outgoing surface such as that of the conventional type, the diffusing angle of the outgoing light is the angle on the line indicating the angle $\alpha$ being zero ($\alpha = 0$), but as the angle $\alpha$ increases, the angle $\Psi$ also increase, thus increasing the angle of the outgoing light. Accordingly, it may be said that the improved light diffusing ability can be endowed to the lens as the angle of the line normal 5 to the lens surface 2 with respect to a line 4 parallel to the optical axis of the lenticle becomes large.

In other words, as a design of the screen, in order that the light outgoing surface of the lens is satisfied with the conditions mentioned above, it will be required to construct each unit lens, i.e. lenticle of the light outgoing side of the screen, so as to have an entire or an arcuate part of semicircular or an approximately semicircular shape and to have an apex located inside the intersecting point of the lights projected in parallel to the optical axis of the lenticle through both ends of the lenticle on the light incident side.

The light diffusing angle can be enlarged by constituting the lenticular lens arrangement on the light outgoing side of the screen so as to have a shape described above, and in addition, the light diffusing angle will be further enlarged by designing the lenticular lens arrangements on the light incident and outgoing sides such that the sectional shape of each lenticle on the light outgoing side is made smaller than that on the light incident side.

Figure 4:
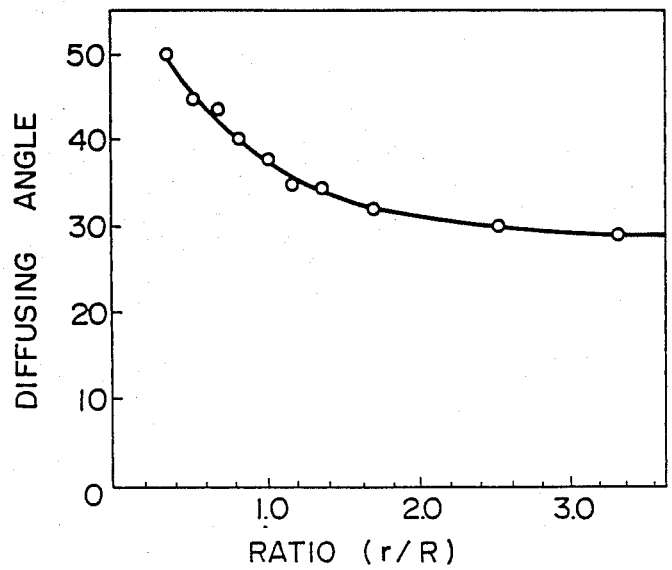
FIG. 4 is a graph representing a relationship between the light diffusing angle and a ratio r/R, where R is a radius of the substantially semicircular section of the lenticle on the light incident side and r is a radius of the substantially semicircular section of the lenticle on the light outgoing side.

In this connection, the graph of FIG. 4 shows the relationship between the diffusing angle and the ratio r/R, where R designates a radius of a semicircle equal or approximate to the sectional shape of the lenticle 20 of the light incident side and r designates a radius of a semicircle equal or approximate to the sectional shape of the lenticle 30 of the light outgoing side. The graph shows the fact that the diffusing angle gradually increases as the ratio r/R decreases.

With the lenticular lens screen of conventional type having a lenticular lens arrangement only on the light incident side in which each lenticle has a semicircular or substantially semicircular sectional shape and having a flat surface on the light outgoing side, the diffusing angle of the light is in general about ±25° with a plane perpendicular to the screen. However, generally, in order to obtain an improved picture quality, it is desired that the diffusing angle is about 40°, and such degree of the diffusing angle can be obtained by keeping the ratio r/R to be less than "1".

The relationship between the diffusing angle and the ratio r/R varies with the shape of the lenticle on the light incident side. The sectional shape of the lenticle on the light incident side appropriate to the practical use has a lens width W ranging from about 1.7 to 2 times of the radius R, and accordingly, in this range, when the ratio r/R is less than "1" (r/R < 1), the diffusing angle is over 40°.

Although in the foregoing description, the principle and function of the lenticular lens screen according to this invention are explained, the details thereof will be further described hereinafter with reference to a concrete example.

It is preferred to constitute the lenticular lens screen 10 with a material having a high transparency, usually a synthetic resin, such as acrylic resin, polymethylmethacrylate resin, styrene denatured acrylic resin, vinyl chloride resin, and polystyrene resin.

The lenticular lens screen 10 is manufactured by means of plane pressing a resin sheet of the material referred to above or by extruding the resin and pressing the extruded resin under heated and pressurized conditions by using a roll means. When the lenticle 20 on the light incident side of the lenticular lens screen 10 is designed so as to have a section of an entire or an arcuate part of a semicircular or an approximate semicircular shape, the width W of the lenticle is ranged from about 1 R to 2 R.

The lenticle 30 on the light outgoing side of the lenticular lens screen 10 has a section of entire or an arcuate part of a semicircular or an approximate semicircular shape, the radius of semicircular being ranged from about 0.5 R to 1 R, and the width w of the lenticle 30 on the light outgoing side is about 0.4 to 0.7 time of the width W of the lenticle 20 on the light incident side.

The thickness of the lenticular lens screen 10, i.e. the distance between the apex of the lenticle 20 and the apex of the lenticle 30 is determined so that the apex S of the lenticle 30 on the light outgoing side is positioned inside the intersecting point M of the lights 1 and 1' projected through both ends of the lenticle 20 on the light incident side in parallel to the optical axis. The intersecting point M is determined by the ratio W/R (basically $0 \leq W/R \leq 2$, but practically $1.7 \leq W/R \leq 2$).

The radius R of the lenticle 20 can be optionally designed, but practically, it is desired to be about 0.3 mm to 3.0 mm. As is apparent from the above description, the whole size of the lenticular lens screen is not limited in the structure and can be optionally designed in accordance with the object to be used or utilized.

The manufacturing methods of the lenticular lens screens of the characters or structures described above will be explained below with reference to preferred examples.

EXAMPLE 1

A polymethylmethacrylate sheet having an index of refraction of 1.49 is extruded by an extruder, and the front and rear surfaces of the extruded sheet are embossed by using an embossing roll means to form lenticular lens arrangement on both surfaces of the sheet. The thus processed sheet is thereafter cooled and cut into pieces having a predetermined size or dimension to obtain a lenticular lens screen 10 according to this invention.

The section of each lenticle, i.e. unit lens, on the light projecting side of the lenticular lens screen 10 has an arcuate portion as a part of approximately semicircular having a radius R of 0.65 mm and a lens width W of 1.2 mm, and the section of each lenticle on the light outgoing side of the screen 10 has an arcuate portion as a part of approximately semicircular having a radius r of 0.50 mm and a lens width w of 0.62 mm. The thickness of the lens is 1.44 mm.

The thus obtained lenticular lens screen 10 was combined with a Fresnel lens screen, not shown and to the combined screen an image was projected by a video-projector, not shown. Light from the video-projector was diffused with a diffusing angle of ±43° with respect to a plane perpendicular to the screen. In practical use, an image was observed within a diffusing angle of ±60° with respect to a plane perpendicular to the screen.

Figure 5:
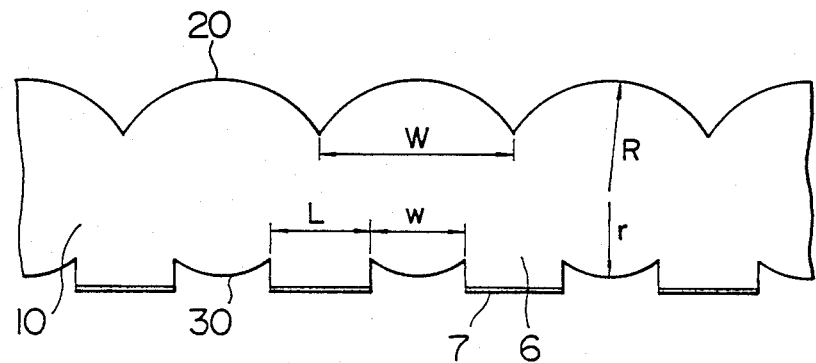
FIG. 5 is a horizontal cross sectional view of a lenticular lens screen of another embodiment according to the invention.

FIG. 5 is an illustration of a part of the horizontal cross section view of a lenticular lens screen of another embodiment according to this invention.

The lenticular lens screen 10 shown in FIG. 5 is provided, on the light outgoing side, with flat land portions 6 through which light does not transmit. The flat portions 6 are located between adjacent lenticles 30, and light absorbing layers 7 are provided on the flat portions 6.

According to the lenticular lens screen of this embodiment, a light projected externally on the flat non-light transmitting portion 6 is not reflected, whereby an image with high contrast can be observed. The light absorbing layer 7 is prepared by means of a printing, coating or transferring method by using a material prepared by adding pigment or flatting agent to an ink or paint. The light absorbing layer 7 thus prepared is usually a black color layer. The lenticular lens screen provided with the light absorbing layer 7 of this character is usually utilized for a color video-projector, because the brightness of a color video-projector is relatively low.

In case the width L of the light absorbing layers 7 is larger, the reflection of the external light on the surface is smaller, so that it is desired to use the lenticular lens screen having light absorbing layers each having as wide a width as possible.

The width L of the light absorbing layer, however, is affected by the thickness of the screen. That is, the thinner the screen thickness is, the larger the width of a screen portion through which the light outgoes is, thus reducing the width L of the light absorbing layer 7. Accordingly, in order to enable the light absorbing layer 7 to have a wide width L, it is desired to constitute the screen so as to have a thickness as large as possible. In this case, it will be desired to design the lenticular lens screen so as to have the apex of the unit lens, i.e. lenticle, on the light outgoing side near the intersecting point of the lights projected through both ends of the lenticle on the light incident side.

The production of the lenticular lens screen of the construction described above will be described hereunder with reference to a preferred manufacturing example.

EXAMPLE 2

A lenticular lens screen 10 was obtained by substantially the same method or process as described with respect to the Example 1 except that stylene denatured acrylic resin having an index of refraction of 1.56 was used as a material for the screen instead of the polymethylmethacrylate resin used in the Example 1.

The light absorbing layers 7 were formed on the flat non-light transmitting portions 6 by coating the black color ink thereon, and each light absorbing layer 7 has a width of 0.58 mm. The thus obtained lenticular lens screen 10 was combined with a Fresnel lens screen and to a combined screen an image was projected by a video projector. Light from the video-projector was diffused with a diffusing angle of ±45° with respect to a plane perpendicular to the screen, and in practical use, an image was observed within the diffusing angle of ±65°. Even in a well-lit room, the lowering of the contrast of a image was small.

In the aforementioned examples, the thickness of the lenticular lens screen was determined on the basis of the intersecting point M of the lights 1 and 1' projected parallelly to the optical axis of the lenticle through both ends of the lenticle on the light projecting side. However, the thickness may be determined by the lights, as a reference, projected at portions inwardly apart from both ends of the lenticle on the light projecting side by distances of about one tenth of the width W of the lenticle. In the latter case, the width of each end portion of the lenticle on the light projecting side will be considered to have a range one tenth of the width W of the lenticle.

Figure 6:
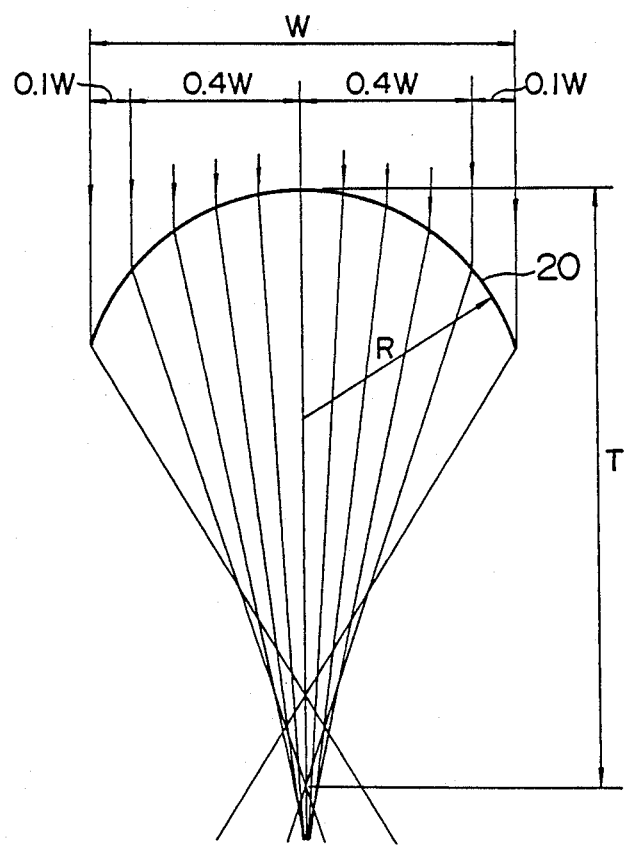
FIG. 6 is a view showing light paths of the lights projected from the light incident sides and also showing the intersecting points of the lights.

FIG. 6 is an illustration of light paths of lights projected in parallel to the optical axis of the lenticle 20 on the light incident side, and lights projected through the points inwardly apart from both ends of the lenticle 20 each by the distance of about 1/10 W are intersected at a point apart from the apex of the lenticle 20 by the distance T.

Figure 7:
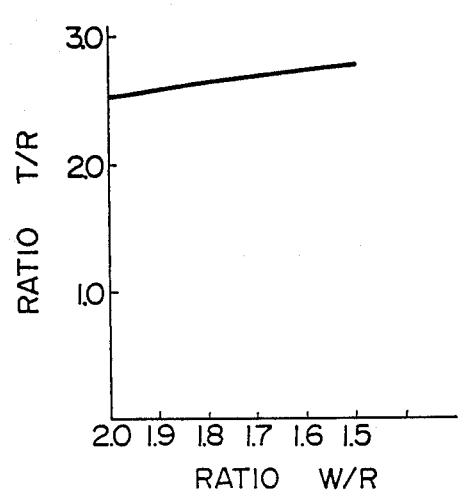
FIG. 7 is a graph showing a relationship between a ratio W/R and a ratio T/R, where W is a width of a lenticle on the light incident side and T is a distance between an apex of the lenticle on the light incident side and an intersecting point of the lights projected on points inwardly apart from the ends of the lenticle each by about one-tenth of the width W.

FIG. 7 is a graph showing the relationship between the ratio W/R and the ratio T/R, where R is a radius of the lenticle 20 on the light incident side and W is the width of the lenticle 20. It is desired that the thickness of the lenticular lens screen is less than a value shown in FIG. 7. As can be shown in FIG. 7 and from the foregoing description, when the thickness of the lenticular lens screen is determined on the basis of the light projected on points inwardly apart from the end portions of the lenticle on the light incident side each by the distance of one tenth of the width W, almost light (about 80%) all of the projected to the lenticle 20 on the light incident side can be effectively transmitted and diffused on the light outgoing side. In a preferred example, when the width W of the lenticle 20 on the light incident side is within a range from 1.7 R to 2.0 R, the thickness of the lenticular lens screen is within a range from 1.0 W to 1.5 W.

Figure 8:
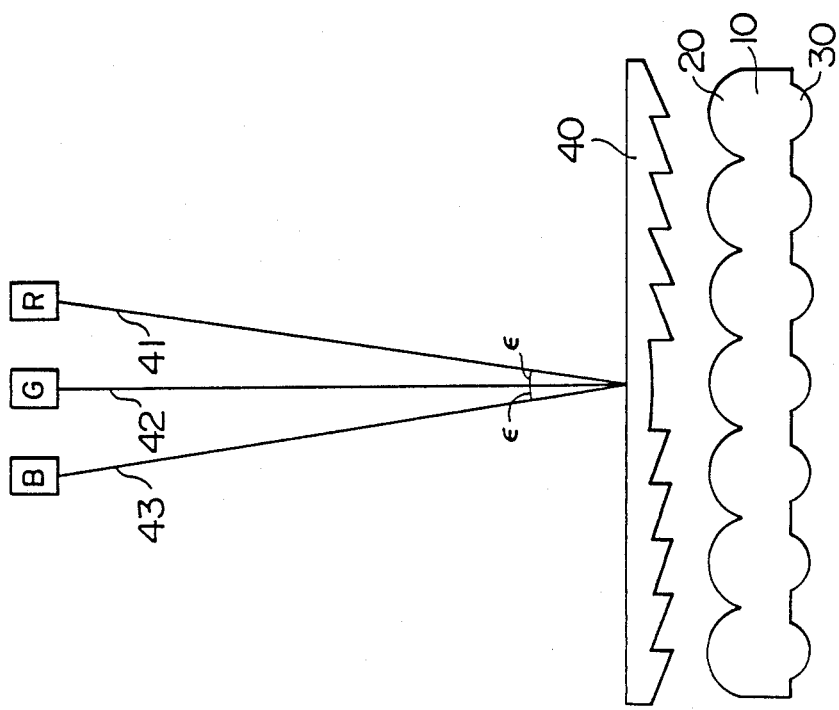
FIG. 8 is a horizontal cross sectional view of a lenticular lens screen according to another embodiment of the invention.

FIGS. 8–11 show another embodiment of the lenticular lens screen according to the invention. In FIG. 8 the lenticular lens screen 10 according to this invention is used as a screen of a rear projection television. In the rear projection television red light 41, green light 42 and blue light 43 are projected through a Fresnel lens 40 from horizontally different positions. The difference $\epsilon$ in the incident angles of projected red, green and blue lights 41, 42, 43 is about 5 to 12°.

Figure 9:
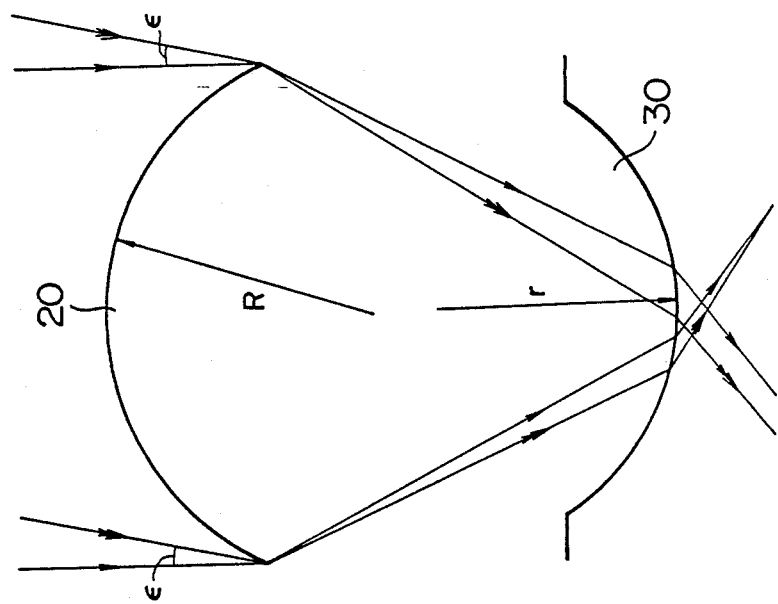
FIG. 9 is a partially enlarged view of FIG. 8 showing the light incident and the light outgoing sides of the lenticular lens.
Figure 10:
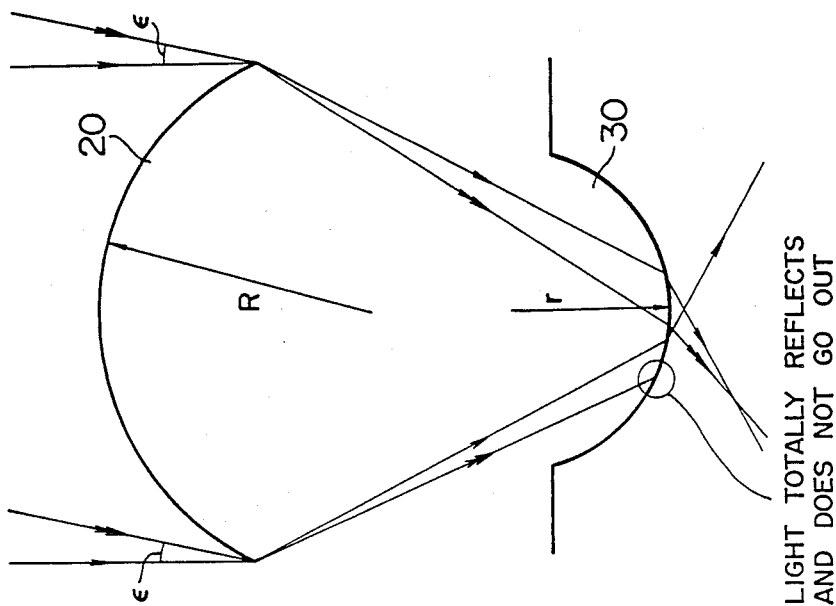
FIG. 10 is a view showing the case that the radius r of the lenticle 30 on the light outgoing side is much smaller than the radius R, and light is totally reflected.

In using the lenticular lens 10 of this invension in the rear projection television having such a structure, the following has to be taken into consideration. That is, as shown in FIG. 9, in a case where red, green and blue lights 41, 42, 43 have different incident angles, the red, green and blue lights 41, 42 43 are incident to the lenticle 30 on the light outgoing side at different positions. In this case, as shown in FIG. 10, when the radius $\Gamma$ of the lenticle 30 on the light outgoing side is much smaller than the radiu R, parts of the red light 41 and the blue light 43 have large incident angles with respect to a line normal to the surface of the lenticle 30 on the light outgoing side. When these incident angles exceed the critical angles, the parts of the lights totally reflect on the light outgoing surface of the lenticle 30 on the light outgoing side, and no light transmit to the light outgoing side. As a result, the brightness of the screen is lowered, and the color tone of an image changes.

Figure 11:
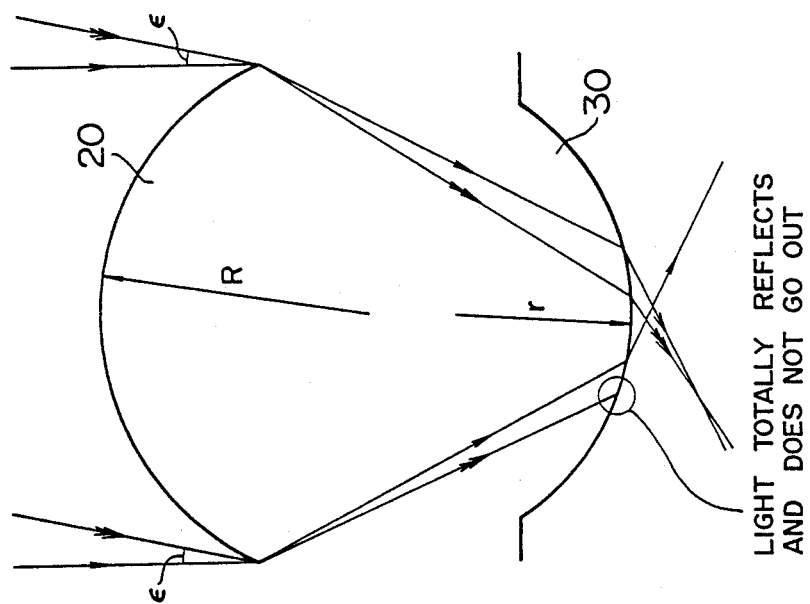
FIG. 11 is a view showing the case that the thickness of the lenticular lens screen is small, and light is totally reflected.

As shown in FIG. 11, in the case where the lenticular lens screen 10 reduces its thickness, as is the case with FIG. 11, parts of the light totally reflect on the light outgoing surface of the lenticle 30 on the light outgoing side, and no light transmits to the light outgoing side. Thus, in using the lenticular lens screen 10 of this invention in a rear projection television, it is necessary that the radius $\Gamma$ of the lenticle 30 on the light outgoing side not be made much smaller than R, and the thickness of the lenticular lens screen not be made too small.

The ranges of variations of the radius $\Gamma$ of the lenticle 30 on the light outgoing side and the thickness of the lenticular lens screen depend on configurations of the light incident surface and differences in the incident angles of the red, green and blue light 41, 42, 43 on the projection television screen.

Specifically, when $\epsilon$ is less than about 10, and W/R, a width W of the lenticle 20 to a ratio of a radius R of the lenticle 20 on the light incident side is 1.7, r/R, a ratio of the radius r of the lenticle 30 on the light outgoing side to a radius R of that on the light projecting side is made larger than 0.7 and smaller than 1.0, while the thickness of the lenticular lense screen 10 is made larger than 0.7 times a distance between an apex of the lenticle on the light incident side and an intersecting point of the lights projected through both ends of the lenticle 20, and smaller than 1.0 times the distance.

To give an example, when R/W=1.7, a diffusion angle of ±40° was obtained, wherein R, a radius of the lenticle 20 on the light incident side is 1.18 mm and W, a width thereof is 2 mm, and r, a radius of the lenticle 30 on the light outgoing side is 0.83 mm, w, a width thereof is 1.2 mm, a thickness of the lenticular lense screen 10 is 2.6 mm, and a distance between an apex of the lenticle 20 on the light incident side and an intersecting point of the lights projected on both ends of the lenticle 20 is 2.89 mm. Practically, however, images can be observed in the range of ±55°. When W/R is 1.96, r/R is made larger than 0.9 and smaller than 1.0 and the thickness of the lenticular lens screen 10 is made larger than 0.9 times a distance between an apex of the lenticle on the light incident side and an intersecting point of the lights projected on both ends of the lenticle 20, and smaller than 1.0 time the distance.

Practically no problems take place.

To give an example, when R/W is 1.96, a diffusion angle of ±45° was obtained, wherein R, a radius of the lenticle 20 on the light incident side is 0.51 mm and w, a width thereof is 1.0 mm, and r, a radius of the lenticle 30 on the light outgoing side is 0.48 mm, W, a width thereof is 0.55 mm and a thickness of the lenticular lense screen 10 is 1.0 mm, and a distance between an apex of the lenticle 20 on the light incident side and an intersecting point of the lights projected on both ends of the lenticle 20 is 1.06 mm. Practically, however, images can be observed in the range of ±60°.

When R/W is 1.7 to 1.96, r/R and a thickness of the lenticular lens screen 10 take medium values between those for R/W=1.7 and those for R/W=1.96.

Preferable diffusion angles are obtained when R/W=1.7, r/R is larger than 0.8, and the thickness of the lenticular lens screen 10 is made larger than 0.8 times a distance between an apex of the lenticle on the light incident side and an intersecting point of the lights projected on both ends of the lenticle 20.

What is claimed is:

1. A lenticular lens screen comprising:
   a substantially planar screen body;
   a first lenticular lens array formed on a first side of said screen body upon which light beams are incident, said first array comprising a plurality of lenticles, said lenticles each having a cross sectional shape, in a plane perpendicular to a plane of said screen body, which corresponds to an entire or arcuate portion of a semicircle; and
   a second lenticular lens array formed on a second side of said screen body, opposite said first side, from which said light beams are transmitted, said second array comprising a plurality of lenticles, said lenticles each having a cross sectional shape, in a plane perpendicular to a plane of said screen body, which corresponds to an entire or arcuate portion of a semicircle;

wherein a radius of the lenticles in the first array is greater than a radius of the lenticles in the second array, and an apex of the lenticles in the second array is inwardly spaced, in a plane parallel to a plane of said screen body, from an intersecting point of light beams projected through the lenticles in the first array, in both end portions of said lenticles, in a direction parallel to an optical axis of said lenticles.

2. The lenticular lens screen of claim 1, wherein the first lenticular lens array comprises a plurality of continuously arranged lenticles, and the second lenticular lens array comprises a plurality of flat portions interposed between adjacent lenticles, said flat portions being inwardly spaced, in a plane parallel to a plane of said screen body, from the apex of said lenticles, said flat portions acting as non-light transmitting portions of the second lenticular lens array.

3. The lenticular lens screen of claim 2, further comprising a light absorbing layer applied to each of said flat portions.

4. The lenticular lens screen of claim 3, wherein said light absorbing layer is colored black.

5. The lenticular lens screen of claim 1, wherein the first lenticular lens array comprises a plurality of continuously arranged lenticles, and the second lenticular lens array comprises a plurality of flat portions interposed between adjacent lenticles, said flat portions being outwardly spaced, in a plane parallel to a plane of said screen body, from the apex of said lenticles, said flat portions acting as non-light transmitting portions of the second lenticular lens array.

6. The lenticular lens screen of claim 5, further comprising a light absorbing layer applied to each of said flat portions.

7. The lenticular lens screen of claim 6, wherein said light absorbing layer is colored black.

8. A lenticular lens screen comprising:
a substantially planar screen body;
a first lenticular lens array formed on a first side of said screen body upon which light beams are incident, said first array comprising a plurality of lenticles, said lenticles each having a cross sectional shape, in a plane perpendicular to a plane of said screen body, which substantially corresponds to an entire or arcuate portion of a semicircle; and
a second lenticular lens array formed on a second side of said screen body, opposite said first side, from which said light beams are transmitted, said second array comprising a plurality of lenticles, said lenticles each having a cross sectional shape, in a plane perpendicular to a plane of said screen body, which substantially corresponds to an entire or arcuate portion of a semicircle;
wherein:

an apex of the lenticles in the second array is inwardly spaced, in a plane parallel to a plane of said screen body, from an intersecting point of light beams projected through the lenticles in the first array, at both end portions of said lenticles, in a direction parallel to an optical axis of said lenticles;
a ratio of a radius of the lenticles in the first array to a width of each lenticle in the first array is about 1.7–2.0;
a ratio of a radius of the lenticles in the second array to the radius of the lenticles in the first array is about 0.7–1.0; and
a ratio of a thickness of the lenticular lens screen to a distance between an apex of the lenticles in the first array and said intersecting point is about 0.7–1.0.

9. The lenticular lens screen of claim 8, wherein the cross sectional shapes of the lenticles correspond to an entire or arcuate portion of a semicircle.

10. The lenticular lens screen of claim 8, wherein the apex of the lenticles in the second array is inwardly spaced, in a plane parallel to a plane of said screen body, from an intersecting point of light beams which are projected through the lenticles in the first array, at inner portions from said end portions of said lenticles, in a direction parallel to an optical axis of said lenticles.

11. The lenticular lens screen of claim 10, wherein the portions of the lenticles in the first array through which said light beams are projected are spaced apart from said end portions of said lenticles by a distance of about 1/10 of the width of said lenticles.

12. The lenticular lens screen of claim 8, wherein the first lenticular lens array comprises a plurality of continuously arranged lenticles, and the second lenticular lens array comprises a plurality of flat portions interposed between adjacent lenticles, said flat portions being inwardly spaced, in a plane parallel to a plane of said screen body, from the apex of said lenticles, said flat portions acting as non-light transmitting portions of the second lenticular lens array.

13. The lenticular lens screen of claim 12, further comprising a light absorbing layer applied to each of said flat portions.

14. The lenticular lens screen of claim 13, wherein said light absorbing layer is colored black.

15. The lenticular lens screen of claim 12, wherein the first lenticular lens array comprises a plurality of continuously arranged lenticles, and the second lenticular lens array comprises a plurality of flat portions interposed between adjacent lenticles, said flat portions being outwardly spaced, in a plane parallel to a plane of said screen body, from the apex of said lenticles, said flat portions acting as non-light transmitting portions of the second lenticular lens array.

16. The lenticular lens screen of claim 15, further comprising a light absorbing layer applied to each of said flat portions.

17. The lenticular lens screen of claim 16, wherein said light absorbing layer is colored black.

* * * * *